United States Patent
Wang et al.

(10) Patent No.: US 7,477,616 B2
(45) Date of Patent: Jan. 13, 2009

(54) POWER SAVING FRAME TRANSMISSION METHOD

(75) Inventors: Huayan Amy Wang, Hauppauge, NY (US); William Sakoda, East Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 516 days.

(21) Appl. No.: 11/047,100

(22) Filed: Jan. 31, 2005

(65) Prior Publication Data

US 2006/0171341 A1 Aug. 3, 2006

(51) Int. Cl.
G04C 17/00 (2006.01)

(52) U.S. Cl. .................. 370/311; 370/328; 370/338; 713/323; 455/574

(58) Field of Classification Search ............ 370/311, 370/328, 338, 346, 203, 412; 455/574, 343.4, 455/352; 713/323
See application file for complete search history.

(56) References Cited

U.S. PATENT DOCUMENTS

| | | | |
|---|---|---|---|
| 4,987,447 A | 1/1991 | Ojha | |
| 5,837,986 A | 11/1998 | Barile et al. | |
| 5,905,249 A | 5/1999 | Reddersen et al. | |
| 5,905,906 A | 5/1999 | Goffinet et al. | |
| 2004/0184475 A1* | 9/2004 | Meier | 370/449 |
| 2005/0003794 A1* | 1/2005 | Liu | 455/355 |
| 2005/0009578 A1 | 1/2005 | Liu | |
| 2005/0018624 A1 | 1/2005 | Meier et al. | |
| 2005/0025167 A1* | 2/2005 | Ishibashi et al. | 370/412 |
| 2005/0135302 A1* | 6/2005 | Wang et al. | 370/329 |
| 2006/0164969 A1* | 7/2006 | Malik et al. | 370/203 |
| 2006/0165046 A1* | 7/2006 | Del Prado Pavon | 370/350 |

FOREIGN PATENT DOCUMENTS

| | | |
|---|---|---|
| EP | 0 996 853 | 4/2000 |
| EP | 1 443 700 | 8/2004 |
| WO | WO2005008967 * | 1/2005 |

* cited by examiner

*Primary Examiner*—Danh C Le
(74) *Attorney, Agent, or Firm*—Fay Kaplun & Marcin, LLP

(57) ABSTRACT

A method that enables the power saving frame transmission comprising an AP informing a plurality of stations within its range in a WLAN about a plurality of scheduled service periods during which the AP has access to a channel in a scheduled service time, receiving the information about the plurality of scheduled service periods by the plurality of stations and deciding about initiating or not initiating a frame transmission, whether or not an acknowledgement and an immediate response expected from other APs pertaining to said WLAN are received prior to a subsequent scheduled service time, wherein the frame is transmitted in a cooperative frame transmission scenario.

16 Claims, 4 Drawing Sheets

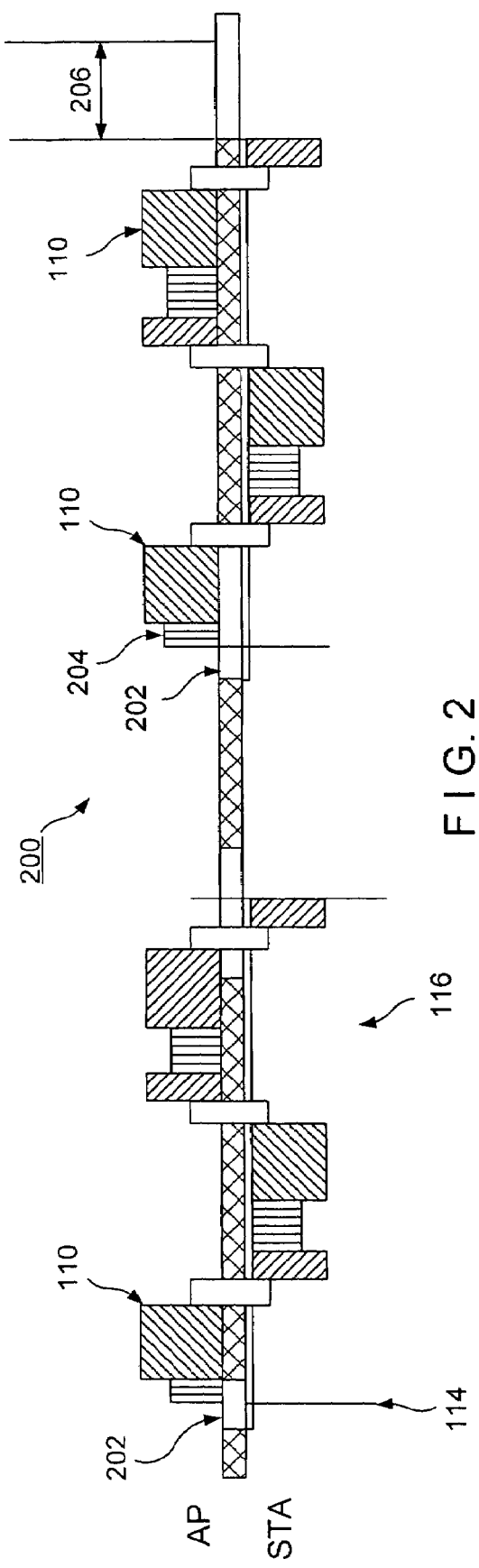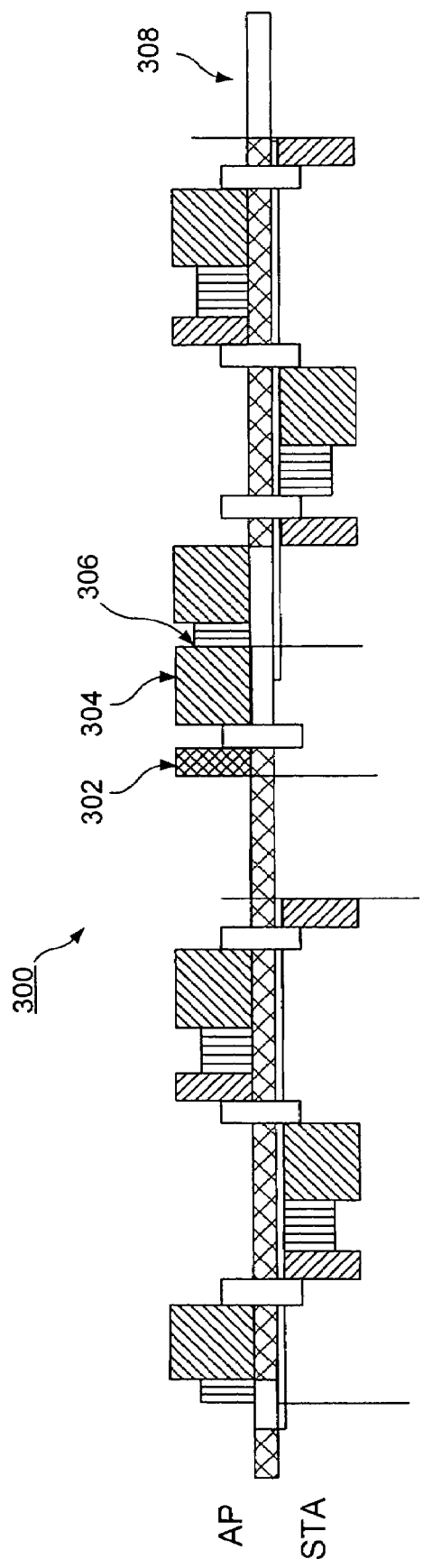

POWER SAVING FRAME TRANSMISSION METHOD

TECHNICAL FIELD

The present invention refers to Medium Access Control (MAC) procedures that support applications in wireless local area networks (WLANs) with Quality of Service (QoS) requirements. In particular, the present invention refers to MAC procedures that support voice, audio, and video applications over the IEEE 802.11e wireless LANs.

BACKGROUND OF THE INVENTION

IEEE 802.11 Wireless Local Area Networks are considered a wireless version of the Ethernet, with the current 802.11 standard supporting only best-effort services. In anticipation of real-time applications, such as voice over WLANs and video streaming, the IEEE 802.11 work group established the 802.11e task group. The aim of this group is to enhance the current 802.11 IEEE MAC protocol and to enable it to support applications with QoS requirements.

At the conceptual core of 802.11e is a Hybrid Coordination Function (HCF), that combines with and enhances some aspects of contention-based and contention-free channel access method outlined in the 802.11 standard, to provide QoS stations (QSTAs) with prioritized and parameterized access to the wireless medium (WM), while continuing to support non-QoS stations (STAs) for best-effort transfers. The two channel access mechanisms are enhanced distributed channel access (EDCA) and HCF controlled channel access (HCCA) mechanisms. With HCF, the basic unit of allocation for the right to transmit in the WM is the transmission opportunity (TXOP). Each TXOP is defined by a starting time and a defined maximum length. The TXOP is obtained either by the station with quality of service (QSTA) by successfully contending for the channel (EDCA-TXOP), or is assigned by the Hybrid Channel HC (HCCA-TXOP).

The HCF clause disclosed by the draft amendment to the standard for telecommunications and information exchange between systems—LAN/MAN, 802.11e, Specific Requirements section, currently describes the QoS enhancements to the MAC in functional terms. Accordingly, QSTAs may access the channel in a more controlled manner than a non-QSTA, and transmit the message protocol data units (MPDUs). The TXOP may be obtained by a QSTA winning an instance of EDCA contention during the contention period (CP), or by a non-AP QSTA receiving a QoS (+)CF-Poll during the CP or contention free period (CFP). The former is EDCA-TXOP, while the latter is HCCA-TXOP or polled TXOP. The draft amendment referred to prior in the document, prescribes that a TXOP shall not extend across a target beacon transmit time (TBTT) or exceed the dot11MaxDwellTime (if using an FH PHY). The occurrence of a TBTT implies the end of the TXOP, after which the regular channel access procedure (EDCA or HCCA) is resumed. It is possible that no frame is transmitted during the TXOP. The foreshortened termination of the TXOP does not imply an error condition. It translates in lost transmission opportunities and unnecessary power consumption, therefore shortening the battery life of the station.

What are needed are means that allow the participation of the stations in the frame transmission without having to contend for the channel and unnecessarily use power while doing so. Therefore, what are needed are means that allow a cooperative participation of the stations in the frame transmission. What are also needed are means that allow access points to have tighter control of the timing of access to the wireless medium for scheduled service. What are further needed are means that reduce jitter for scheduled services and induce power savings for stations that wake-up for scheduled services, especially for the stations operating in power saving mode.

BRIEF SUMMARY OF THE INVENTION

The present invention refers to methods and apparatuses that enable the cooperative participation of stations in frame transmission, therefore allowing access points to have strict control of the timing of access to the wireless medium for scheduled service.

The present invention also refers to methods that allow the reduction of jitter for scheduled service and allow power saving for stations operating in power saving mode, that wake up for scheduled services.

The present invention is a power saving frame transmission method that comprises the AP informing a plurality of stations within its range in a WLAN about scheduled service periods; receiving the information about the scheduled service periods by the plurality of stations; and deciding about initiating or not initiating a frame transmission, depending on an acknowledgement and an immediate response expected from other APs pertaining to the WLAN and received prior to the next scheduled service time, while the frames are transmitted in a cooperative frame transmission scenario. The AP communicates with the plurality of stations through dedicated broadcast management frames, through proprietary data frames, through special information elements in relevant 802.11 frames, and through special header/trailer fields in relevant 802.11 frames. An agreement is reached between the access point and the stations about the service periods. All cooperative stations refrain from transmitting at the beginning of the service period.

The present invention further relates to another power saving frame transmission method that comprises informing, in a WLAN, a plurality of stations from an AP within its range about scheduled service periods while the AP intends to have access to a channel, reaching an agreement about a specific start time of service between a plurality of access points in a wireless medium, sending a frame according to a cooperative frame transmission method if an agreement is reached, enforcing the scheduled service times by the AP gaining control of the wireless medium ahead of time, sensing if the wireless medium is busy after gaining control of the wireless medium, sending another CTS packet with adjusted duration DIFS after the wireless medium clears. The AP gains control of the wireless medium at least one packet time ahead of a next scheduled service time by sending a CTS to self frame with a predetermined duration field, and the AP uses PIFS to gain propriety access to the wireless medium. The foregoing and other features and advantages of the present invention will be apparent from the following more particular description of the preferred embodiments of the invention, as illustrated in the accompanying drawings.

BRIEF DESCRIPTION OF THE DRAWINGS

The present invention is described with reference to the accompanying drawings. In the drawings, like reference numbers indicate identical or functionally similar elements. Additionally, the left most digit(s) of a reference number identifies the drawing in which the reference number first appears.

FIG. 2 illustrates the transmission of the frame under cooperative stations service scenario;

FIG. 3 illustrates an AP enforced frame transmission scenario;

DETAILED DESCRIPTION OF THE PREFERED EMBODIMENTS OF THE INVENTION

The following detailed description is merely exemplary in nature and is not intended to limit the invention, applications and uses of the invention. Furthermore, the invention is not intended to be limited by any expressed or implied theory presented in the preceding technical field, background, brief summary or the following detailed description.

In the following detailed description of the preferred embodiments, reference is made to the accompanying drawings that form a part thereof, and in which are shown by way of illustration specific embodiments in which the invention may be practiced. It is to be understood that other embodiments may be utilized and structural changes may be made without departing from the scope of the present invention.

Figure 1:
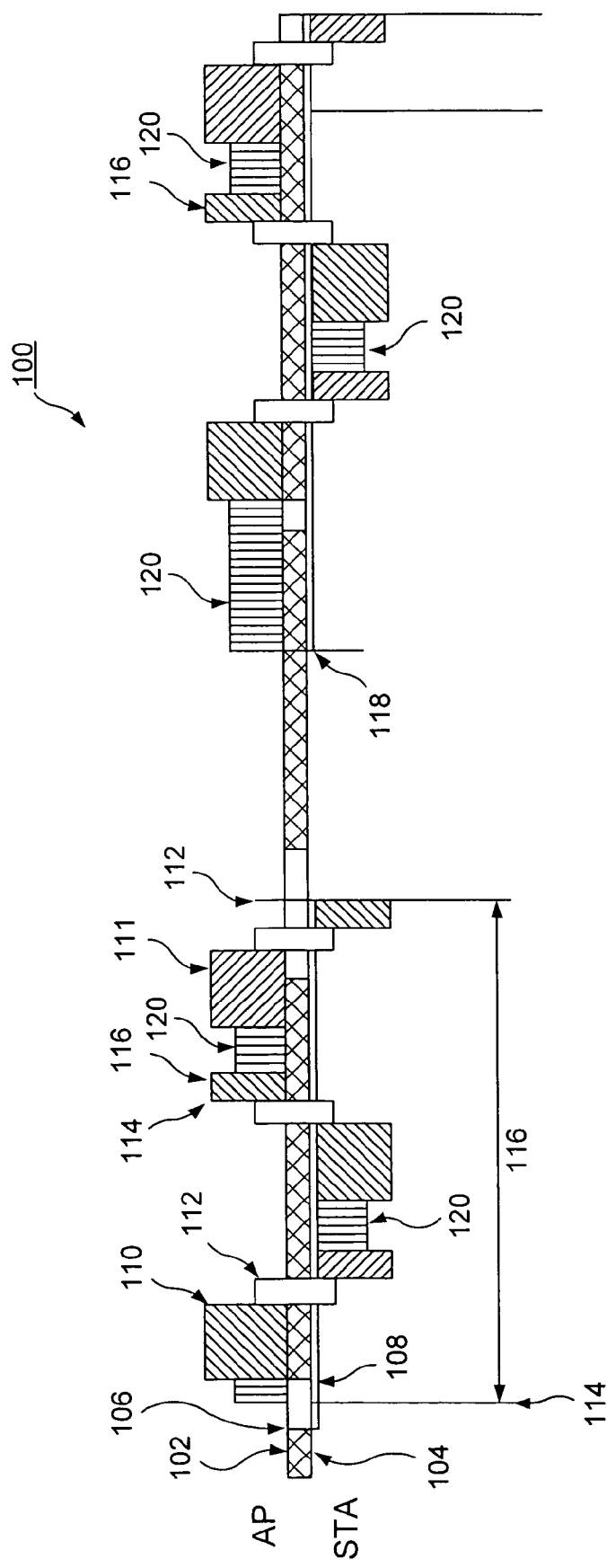
FIG. 1 illustrates a scheduled automatic power-save delivery frame transmission in accordance with the current 801.11e draft.

FIG. 1 illustrates a scheduled automatic power-save delivery frame transmission, in accordance with the current 801.11e draft.

Scheduled service periods in Automatic Power Save Delivery (APSD) are defined for both access mechanisms in IEEE standard 802.11, EDCA or HCCA. A scheduled service period, which is established with a downlink or bidirectional traffic specification (TSPEC) with the automatic power save delivery (APSD) set to 1 and the schedule subfield set to 1 (if EDCA is used), is repeated regularly at the service interval, with the first service period starting at the start of service time. The service interval and start of service time, which are returned by the AP in the schedule element, are determined so that the overlap between service periods of different non-AP QSTAs is minimal. An example of a method for deriving such a schedule is discussed below.

A non-AP QSTA indicates the time when it first expects to receive traffic associated with the submitted APSD TSPEC in order to reduce the time the station spends in the awake state. The AP adjusts the service start time in the schedule element in order to stagger the service periods of different stations and thus shorten the time each power-saving station spends in the awake state. Unless a schedule is already established for the non-AP QSTA, the adjusted value of the service start time will be either the same or later than the requested service start time in the TSPEC element. It should not be delayed longer than twice the duration of a service period relative to the requested service start time. If a schedule is already established for a non-AP QSTA, the service start time returned upon receipt to a new TSPEC element from the same station can be made equal to the time the next established service period is expected to start following the transmission of the new schedule element, as the station is expected to be in the awake state at that time. If no service start time is requested in the TSPEC element (for example, if the value of this field is set to 0), it will be treated as if it were the same as the time the TSPEC element was received. If several TSs are established by a non-AP QSTA with subfield APSD=1 and subfield Schedule=1, and the aggregation subfield is set to 1. The AP responds with an aggregate schedule for all admitted TSPECs from a non-AP QSTA, where the service interval does not exceed the lowest Max service interval established by the non-AP QSTA for the TSs. The service start time will not be later than one service period away from the earliest service start time for all the TSs established for an APSD station.

The scheduled APSD is the only APSD option available to power-saving stations using HCF controlled access. At the start of the service period, the AP initiates a polled TXOP by sending the frames buffered for the power-saving station onto QoS CF-Poll frames or QoS frames, preferably piggybacked, for greater efficiency.

Scheduled APSD enables the power-saving stations that use EDCA for channel access to have a service period occur according to a pre-specified schedule. The AP, aware of the schedule, attempts to deliver the buffered frames promptly at the start of the service period. Therefore, the AP reduces the time spent by the non-AP QSTA in the awake state while waiting to receive its buffered frames from the AP. Aggregation of multiple independent traffic streams at the station can be facilitated readily with scheduled APSD due to the predetermined, previously set wake-up times. The schedule, which is generated by the AP, staggers the service periods of different stations, thus helping the APSD stations that contend for the channel access to avoid collisions among themselves. The AP also attempts to minimize the overlap of different service periods, therefore reducing the time spent by the non-AP QSTA in the awake state while waiting to access the channel or receive the buffered frames from the AP. It is recommended that at the start of a service period, for the AP to transmit the frames buffered for the station and to refrain from transmitting for a short time interval, in order to enable the station to gain access to the channel immediately. This way the station does not have to wait in the awake state for the AP to complete its various other transmissions, which would drain the station's power, as the AP has a heavier traffic load than the non-AP stations.

According to the current 802.11e draft and as represented in FIG. 1, the non-STA is in sleep mode 104 and wakes up to active state 106 ahead of the scheduled service start time 114 in order to get ready to receive data from the AP 102. The AP prepares the data to be sent to the STA at the scheduled service start time 114 and follows a proper channel access rule, either EDCA or HCCA, 120. If the wireless medium is idle 106 at the start of the service interval, AP senses the channel idle for AIFS if in EDCA mode or PIFS if in HCCA mode and then starts sending the data packets 110 to the STA. The STA receives the packet and sends an ACK 114 within SIFS time 112. Afterward, if the STA still has something to send, it has to follow the channel access rule (EDCA or HCCA) to send its data packet and the AP will send an ACK within SIFS time after receiving the data packet. Then the AP will send another data packet or a Null data packet with the EOSP bit set to 1, 111, to indicate the end of the service period. The STA receives packet 111 and sends an ACK within SIFS time. Pursuant, it goes back into sleep mode 104. This sequence constitutes a service period 116. At the next service period (starts after service interval+previous service start time), the same process is repeated. However, if the wireless medium is busy 102 at the start of service period due to the presence of other transmissions, the AP has to wait for channel access following the proper rules (EDCA or HCCA). If EDCA is used, the AP has to start a backoff process after the current busy period. If HCCA is used, AP can gain channel access PIFS after the current busy period. After AP gains channel access, it sends the data packet 110 and receives ACK, similar to the process described in connection with the previous service period.

In a cooperative power saving frame transmission scenario the access point in the WLAN informs the stations within its range about the timing of the scheduled service periods the access point intends to allow access to the channel. When a co-operative station "hears" this information, it does not initiate transmission of a frame unless the transmission, and any acknowledgement or other immediate responses expected from a peer MAC entity are completed prior to the next scheduled service time.

The AP communicates this information through dedicated broadcast management frames, proprietary data frames, special information elements encoded in relevant 802.11 frames, or special header/trailer fields in relevant 802.11 frames.

A station that understands and obeys this rule is a "co-operative station". The co-operative station may experience longer delay for the transmission of some of its frames. This rule allows APs to have access to the wireless medium at the scheduled time, and thus reduces jitter in the timing of the scheduled services, which improves the quality of real-time services, such as Voice over IP. Equally important, it helps stations operating in power saving mode to avoid unnecessary waiting and power consumption when they wake up for scheduled service periods.

As an example, with mutual agreement, the AP can group multicast packets for the power-saving stations and send them out at an agreed time. All its clients will wake up at the scheduled time to receive the traffic and will go back to sleep after receiving all the packets.

FIG. 2 illustrates the transmission of the frame under cooperative stations service scenario.

In the frame transmission scenario 200, all non-STAs are co-operative stations. The AP informs all the STAs about the schedule of service periods. At the start of a service period 114, the wireless medium is idle because all the co-operative STAs refrain from transmitting, 202, across the service start time. Therefore, at the start of the service period, the AP senses that the channel is idle, for AIFS if in EDCA mode, or PIFS if in HCCA mode, and then starts sending the data packet 110 to the STA. As a result, the service interval is shortened with time interval 206, because the contention for the channel, to realize the frame transmission, is eliminated.

A comparison between the total time necessary to transmit a frame, in accordance to the mechanism of scheduled APSD, as it is presented in the 802.11e draft, and the total time necessary to transmit a frame in the cooperative stations scenario, reveals that the total time necessary to realize the transmission is shorter in the cooperative frame transmission scenario. The direct consequence of using a cooperative frame transmission scenario is reduced power consumption and reduced jitter.

Without this solution, if the wireless medium is busy at the scheduled time, the AP must wait for the packet in transmission (and necessary acknowledgement) to finish before it can "grab" the wireless medium, using priority inter frame spacing (PIFS) if in HCCA mode, or backoff after AIFS, if in EDCA mode. This introduces jitter and keeps power-saving stations waiting.

FIG. 3 illustrates a power saving AP-enforced frame transmission scenario.

As shown in FIG. 3, if the environment has both co-operative clients as well as standard clients (that are unaware about the cooperative rules or are not willing to obey them), an AP can enforce the scheduled service times by gaining control of the wireless medium well ahead of time. For example, the AP can gain control of the WM one-packet time (measured dynamically from traffic statistics or from maximum size) ahead of next scheduled service time by sending a CTS-to-self frame with proper duration field. The AP uses PIFS to gain priority access to the WM. The AP can send traffic afterwards as long as it makes sure its transmission will end before the scheduled time.

If AP senses that the WM is busy after sending CTS (which implies a collision), the AP sends the CTS packet again (with adjusted duration) DIFS after the WM clears. Also, if the packet in the air has the "more fragment" bit set when it is time for the AP to send the CTS-to-self packet, AP should send CTS-to-self to cause collision so the AP can take over the WM. The AP takes control of the channel one packet time ahead of service start time by sending a CTS-to-self packet 302. After a SIFS the AP can send a packet to other stations 304 if it has data queued as long as it finishes by service start time. At the start of service time, the AP senses the channel idle for AIFS, if in EDCA mode, or PIFS, if in HCCA mode, and then starts sending the data packet 110 to the station. Again, the shortened overall time required by the transition 308 translates to reduced power consumption and reduced jitter.

With the CTS-based enforcement mechanism, the interval after CTS might be wasted if the AP doesn't have traffic to send or if the CTS causes a collision. Obviously it is beneficial to have co-operative clients that schedule their transmissions.

This feature requires the co-operation of both wireless infrastructure and client sides, and can provide competitive advantages, especially in area of power-saving operation and voice over IP applications.

Figure 4:
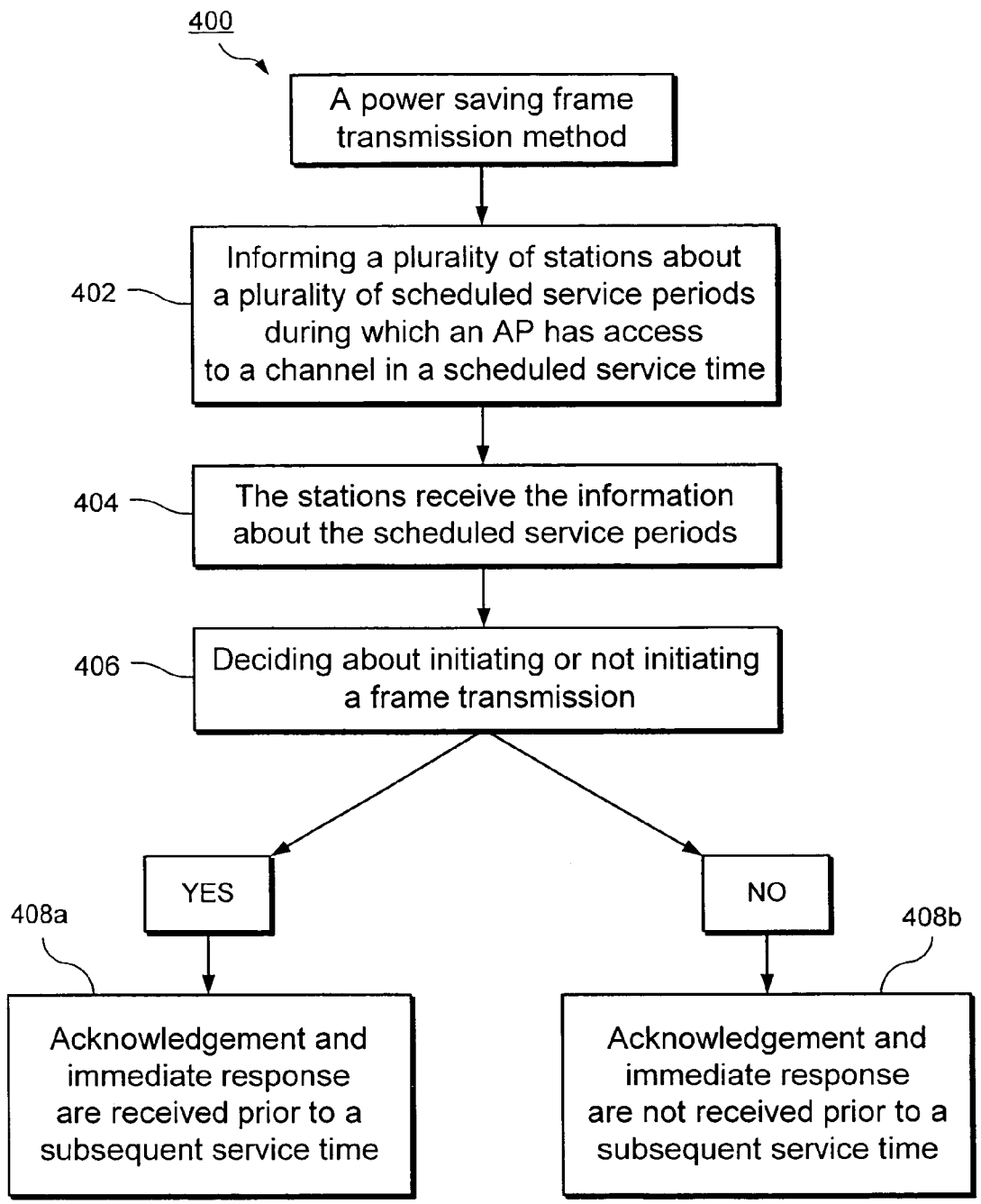
FIG. 4 is flowchart illustrating the cooperative method of the present invention.

FIG. 4 is flowchart illustrating the cooperative method of the present invention.

A power saving frame transmission method 400 comprises the following steps: step 402 consists of informing a plurality of stations within the APs range in a WLAN about a plurality of scheduled service periods during which the AP has access to a channel in a scheduled service time; step 404 consists of receiving the information about the plurality of scheduled service periods by the plurality of stations; and steps 406 and 408 (a or b) consisting of deciding about initiating or not initiating a frame transmission, weather or not an acknowledgement and an immediate response expected from the other stations pertaining to the WLAN are received prior to a subsequent scheduled service time, the frame being transmitted in a cooperative frame transmission scenario.

Figure 5:
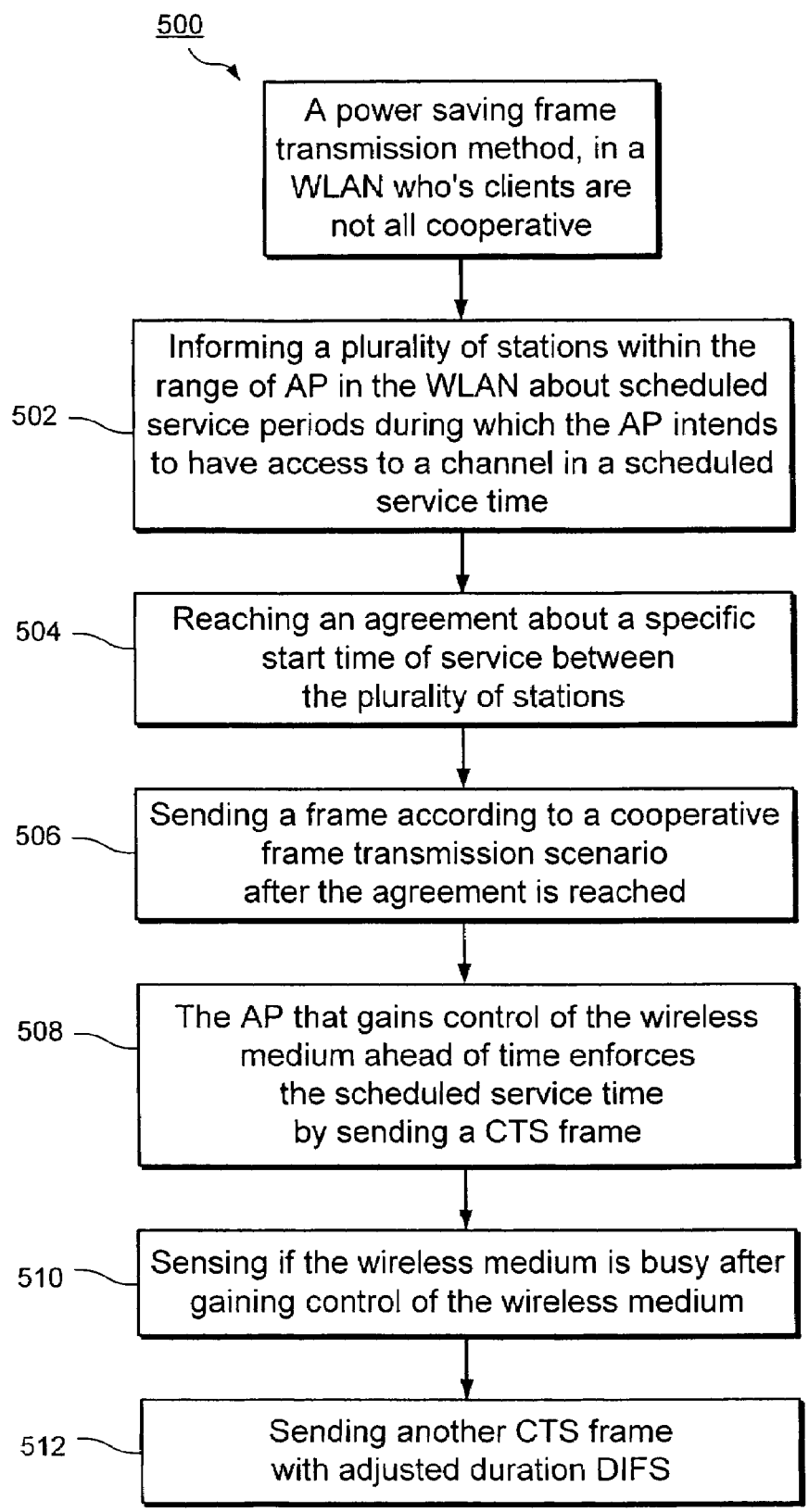
FIG. 5 is another flowchart illustrating an assorted, cooperative with non-cooperative, method of the present invention.

FIG. 5 is another flowchart illustrating an assorted, cooperative with non-cooperative, method of the present invention.

A power saving frame transmission method 500 in a WLAN who's clients are not all cooperative, comprises the following steps: step 502 that consists of informing a plurality of stations within a range of an AP in the WLAN about scheduled service periods during which said AP intends to have access to a channel in a scheduled service time; step 504 consists of reaching an agreement about a specific start time of service between a plurality of stations to whom the AP pertains in a wireless medium; step 506 consists of sending a frame according to a cooperative frame transmission scenario if said agreement is reached; step 508 consists of enforcing the scheduled service time by the AP that gains control of the wireless medium ahead of time by sending a CTS frame; step 508 consists of sensing if the wireless medium is busy after gaining control of the wireless medium, and step 510 consists of sending another CTS frame with adjusted duration DIFS after the wireless medium clears. The AP gains control of the wireless medium one packet time ahead of a next scheduled service time, the CTS to self frame has a predetermined duration field, and the AP uses PIFS to immediately gain exclusive access to the wireless medium.

What is claimed is:

1. A system, comprising:
wireless computing stations, each of the stations utilizing a power save mode and a wake mode; and
an access point transmitting a wireless signal including schedule data on a wireless communication channel, the schedule data indicative of a service period start time and a service period interval for each of the stations,
wherein each of the stations switch from the power save mode to the wake mode at a corresponding service period start time and remain in the wake mode for a corresponding service period interval, and
wherein, during the corresponding service period interval, each of the stations communicates frames with the access point,
wherein a wireless medium is maintained in an idle state during a time prior to an initiation of the service period, and
wherein the wireless medium is maintained idle in a contention-free mode of operation of the system.

2. The system of claim 1, wherein, when the access point uses an enhanced distributed channel access (EDCA) mechanism, the access point waits for an arbitration interframe spacing (AIFS) after the corresponding service period start time before transmitting a frame.

3. The system of claim 1, wherein, during the corresponding service period interval, a corresponding one of the stations responds td a frame received from the access point by transmitting an acknowledgement frame with a data frame piggybacked thereon.

4. The system of claim 1, wherein the frames are one of media and data frames.

5. The system of claim 1, wherein the wireless signal including the schedule data is one of a broadcast frame, a management frame and a data frame.

6. The system of claim 1, wherein the schedule data is contained in a field in an IEEE 802.11 frame.

7. The system of claim 6, wherein the field is one of a header and a trailer.

8. A system, comprising:
wireless computing stations, each of the stations utilizing a power save mode and a wake mode; and
an access point transmitting a wireless signal including schedule data on a wireless communication channel, the schedule data indicative of a service period start time and a service period interval for each of the stations,
wherein each of the stations switch from the power save mode to the wake mode at a corresponding service period start time and remain in the wake mode for a corresponding service period interval, and
wherein, during the corresponding service period interval, each of the stations communicates frames with the access point,
wherein a wireless medium is maintained in an idle state during a time prior to an initiation of the service period, and wherein, when the access point uses a hybrid coordination function (HCF) controlled channel access (HCCA) mechanism, the access points waits for a point coordination function (PCF) interframe spacing (PIFS) after the corresponding service period start time before transmitting a frame.

9. A method, comprising:
receiving, in a wireless station of a plurality of wireless stations a wireless network, schedule information identifying at least one service period;
maintaining a wireless medium idle during a time prior to an initiation of the at least one service period; and
sending a frame on the wireless medium after a start of the at least one service period, the sending of the frame occurring without a procedure for contending for the wireless medium being performed, wherein the wireless medium is maintained idle in a contention-free mode of operation of the network.

10. The method of claim 9, wherein all wireless stations in the plurality of wireless stations are co-operative stations.

11. The method of claim 9, wherein the wireless medium is idle at the start of the at least one service period.

12. The method of claim 9, wherein: the wireless station receives the schedule information from an access point, and the access point transmits the schedule information without waiting for another frame to complete transmission through the wireless medium.

13. The method of claim 12, wherein: the access point uses an enhanced distribution channel access (EDCA) mechanism, the access point waits for an arbitration interframe spacing (AIFS) after the corresponding service period start time before transmitting the frame.

14. The method of claim 9, wherein the frame includes one of a media frame and a data frame.

15. The method of claim 9, wherein the schedule information is transmitted in one of a broadcast frame, a management frame, and a data frame.

16. A method, comprising: receiving, in a wireless station of a plurality of wireless stations a wireless network, schedule information identifying at least one service period;
maintaining a wireless medium idle during a time prior to an initiation of the at least one service period; and
sending a frame on the wireless medium after a start of the at least one service period, the sending of the frame occurring without a procedure for contending for the wireless medium being performed,
wherein the wireless station receives the schedule information from an access point, and the access point transmits the schedule information without waiting for another frame to complete transmission through the wireless medium, and
wherein the access point uses a hybrid coordination function (HCF) controlled channel access (HCCA) mechanism, the access point waiting for a point coordination function (PCF) interframe spacing (PIFS) after the corresponding service period start time before transmitting the frame.

* * * * *